July 27, 1943.   E. T. DAVIS   2,325,308
ELECTRICAL SYSTEM
Filed April 22, 1942
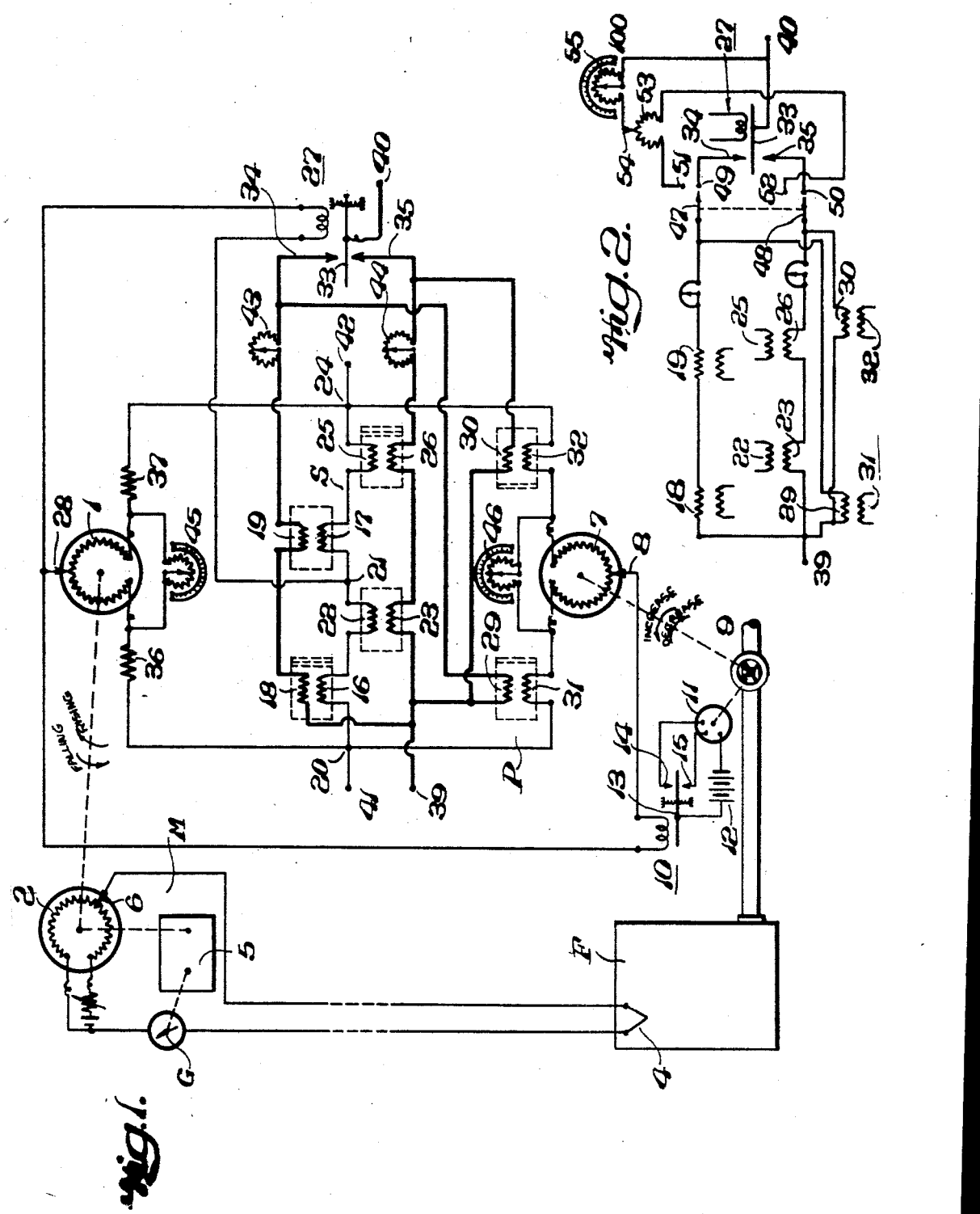
INVENTOR.
Elwood T. Davis
BY
C. L. Ebert
ATTORNEY Patented July 27, 1943

2,325,308

UNITED STATES PATENT OFFICE 2,325,308

ELECTRICAL SYSTEM

Elwood T. Davis, Brookline, Pa., assignor to Leeds and Northrup Company, Philadelphia, Pa., a corporation of Pennsylvania Application April 22, 1942, Serial No. 440,039

14 Claims. (Cl. 236—68)

My invention relates to electrical systems, for example control systems for varying the application of an agent to regulate the magnitude of a condition, for example temperature, or other physical, chemical or electrical condition.

In accordance with my invention, the unbalancing and/or rebalancing of a network, including impedances adjusted respectively in accordance with the changes of magnitude of a condition and with the changes in rate of application of an agent affecting the magnitude of that condition, is or are contributed to by at least one impedance having substantial temperature coefficient of impedance disposed in heat transfer relation with a heater controlled in response to unbalance of a second balanceable network; more particularly, the second network includes an impedance, adjusted in accordance with aforesaid changes in magnitude of a condition, and other impedances having different temperature coefficients of impedance and in heat transfer relation with heaters controlled concurrently with the heater or heaters associated with a thermally-variable impedance or impedances of the first-named network.

My invention further resides in systems having the features of combination and arrangement hereinafter described and claimed.

For an understanding of my invention reference is made to the drawing in which:

Fig. 1 diagrammatically illustrates the invention as applied, by way of example, to control of the temperature of a furnace;

Fig. 2 diagrammatically illustrates a modification of a portion of Fig. 1.

The slide-wire 1, generically representative of a variable impedance, is adjusted in accordance with the changes in temperature of furnace F to positions corresponding with the furnace temperature. Though not limited thereto, the adjustment of resistance 1 is preferably effected by mechanical relay mechanism of the general type disclosed in U. S. Letters Patent 1,935,732 to Squibb; more particularly, the slide-wire 1 of control network P is adjusted concurrently with potentiometer slide-wire 2, supplied with current of standardized magnitude by battery 3 or equivalent, of measuring network M.

The effective voltage of slide-wire 2 is opposed to the voltage developed by thermo-couple 4 responsive to changes in furnace temperature. Upon increase or decrease in temperature from the magnitude for which the measuring network M was previously balanced, the galvanometer G, or equivalent, responds to the unbalance between aforesaid voltages and through suitable relay mechanism, generically indicated by the rectangle 5, effects a rebalancing adjustment of slide-wire 2 with respect to its contact 6. Concurrently with this rebalancing of network M the slide-wire 1 is adjusted to a new position corresponding with the then existing temperature and so unbalances the control network P, a Wheatstone bridge, comprising slide-wire 1 and a slide-wire 7 whose position with respect to its contact 8 is determined by the setting of the valve 9, or equivalent control member, which regulates the supply of an agent, fuel in Fig. 1, affecting the magnitude of the condition to be regulated or controlled.

In response to unbalance of control network P, the relay 10, or equivalent, such as a contact-galvanometer, effects energization of reversible motor 11, or equivalent, to change the setting of valve 9 in proper sense to check the increase or decrease in temperature and concurrently to adjust slide-wire 7 in sense or direction restoring balance of the bridge network P.

Though not limited thereto, the reversible motor 11 may be of the split field type supplied from a suitable source of current, generically represented by the battery 12, and the selective energization of whose fields is controlled by the relay contacts 13, 14 and 15 of relay 10.

Of the system as thus far described, assuming the extents of adjustment of valve 9 for given changes in position of slide-wire 7 have been selected to avoid hunting or over-shooting and so ensure stability, the temperature-load characteristic is a drooping one; i. e., valve 9 for each increment of increase of furnace load is adjusted to position affording a temperature somewhat less than that for lighter loads.

To eliminate this droop of the load-temperature characteristic, or equivalent characteristic when the controlled condition is other than temperature, and without need for inclusion in network P of adjustable resistances or rheostats whose contact resistance introduces inaccuracies or uncertainties in the balance point of network P, and without need for reversible motors to actuate such rheostats at rather frequent intervals, there is utilized a second balanceable network including the resistors 16, 17, 22 and 26 of nickel or other conductor having substantial temperature coefficient of resistance. These four resistors comprise two arms of a Wheatstone bridge S in another or other of whose arm or arms may be included a slide-wire adjusted in unison with slidewire 1 or, for simplicity, slide-wire 1 and the associated end coils or resistors 36, 37 of network P may be common to that network and network S.

Resistor 16 is in intimate heat transfer relation with a heating element or coil 18; preferably the heating and resistor coils are wound on a common form which is of substantial mass to insure relatively slow rate of change of temperature of resistor 16 during heating and cooling thereof when heater 18 is energized and deenergized.

The resistor 17 is in intimate heat-transfer relation with a heating element or winding 19; preferably the heater 19 and impedance 17 are wound upon a common form which is of small mass to ensure relatively rapid change of temperature of resistor 17 during heating and cooling thereof during periods of energization and de-energization of heater 19.

By way of example, the resistors 16 and 17 may have, when at the same temperature, the same magnitude of resistance and their heaters 18 and 19 may be designed to effect the same ultimate temperature rise of each resistor; however, as previously stated, the thermal inertias of the two assemblies 16—18 and 17—19 are substantially different so that when the heaters 18 and 19 are concurrently energized the resistances of resistors 16 and 17 both approach the same final magnitude of resistance but at substantially different rates.

In series with resistance 16, in that branch of the second balanceable network S defined by points 20 and 21, there is included resistor 22 of nickel, or other conductor having substantial temperature coefficient of resistance, and in intimate thermal relation with heater 23 which may be wound upon the same form whose mass is relatively small to afford rapid change of the resistance of resistor 22 during the heating and cooling thereof consequent to energization and de-energization respectively of heater 23.

In series with resistance 17, in that branch of the second balanceable network S defined by points 21 and 24, is included resistor 25 also of nickel, or equivalent material having substantial temperature coefficient of resistance, and in intimate thermal relation with heater 26, preferably wound on the same form as resistor 25. The mass of the form is large to provide relatively slow rate of change of resistance of resistor 25 upon energization and de-energization of heater 26.

By way of example, resistors 22 and 25 may have, when at the same temperature, the same magnitude of resistance and their heaters 23, 26 may be designed to effect the same ultimate temperature rise of each of the resistors although because of the difference between the thermal inertia of the two assemblies 22—23 and 25—26 the resistances of resistors 22 and 25 increase at substantially different rates upon the concurrent energization of their heaters.

The relay 27, such as a contact-galvanometer or equivalent, controls the energization and de-energization of the heaters 18, 19, 23 and 26 in response to unbalance of network S substantially independently of balance or unbalance of network P, and to that end in the particular system shown is connected between point 21 of the composite network P, S and the contact 28 of slide-wire 1 common to both of the independently balanceable networks P and S.

Relay 27 also controls the energization of heaters 29 and 30 thermally associated respectively with resistors 31, 32, of nickel or other conductor whose resistance varies with temperature, included in adjacent arms of bridge P; the resistances of resistors 31, 32 may, when the resistors are at the same temperature, be equal and the heaters 29, 30 may be designed to afford the same ultimate rise in temperature of the resistors. The thermal inertia of each of the two assemblies 29—30 and 31—32 is determined, as by selection of the mass of the winding form, to be intermediate the thermal inertia of assemblies 16—18 and 25—26, on one hand, and the thermal inertia of assemblies 22—23, 17—19 on the other hand.

When network S is unbalanced in one sense, movable contact 33 of relay 27 is moved into engagement with contact 34 concurrently to energize heaters 18, 19 and 29 whereas when network S is unbalanced in opposite sense, the contact 33 is moved into engagement with contact 35 concurrently to energize the heaters 23, 26 and 30. When network S is balanced, the movable contact 33 of relay 27 is out of engagement with both of its fixed contacts 34, 35 and all of the heaters 18, 19, 23, 26, 29 and 30 are de-energized; the magnitude of each of the resistances 16, 17, 22, 25, 31 and 32 then depends upon the immediately prior history of operation of the control system.

Current for energizing the networks and the heaters may be supplied from any suitable source or sources of direct or alternating current; for example, the terminals 39, 40 of the heater circuit may connect to a 110 volt 60 cycle power line and terminals 41, 42 of the control network P, S may connect to the secondary of a step-down transformer energized from the same source.

For simplicity of explanation, it is assumed that end coils 36, 37 are of equal resistance and that when the temperature of furnace F is at desired or normal magnitude the contact 28 of slide-wire 1 is substantially midway, electrically, of its terminals. It is also assumed that when network P is balanced at normal furnace temperature, the resistors 31 and 32 are of equal resistance and that contact 8 is midway, electrically, of slide-wire 7 (normal load).

Now assuming the furnace temperature drops to subnormal magnitude, slide-wire 1 is moved, for example counter-clockwise in Fig. 1, to a position corresponding with the lowered temperature whereupon relay 10 responds to unbalance of network P and effects rotation of motor 11 in direction to increase the opening of fuel valve 9 to extent substantially proportional to the fall in temperature and to effect a rebalancing adjustment of slide-wire 7—counter-clockwise in Fig. 1. This control action is completed in a short time and serves to check further decrease of temperature.

The displacement of contact 28 from its "control" position (the relative position of contact 28 and slide-wire 1 corresponding with desired magnitude of furnace temperature or other condition to be controlled) unbalances the network S in sense causing relay 27 to energize heater 29 and so increase the resistance of resistor 31. Network P is therefore gradually unbalanced in the same sense as before and motor 11, under control of relay 10, effects further opening movement of valve 9. Concurrently with energization of heater 29 to effect aforesaid unbalance of network P, the heater coils 18 and 19 are also energized quickly to raise the resistance of resistor 17, an effect tending to rebalance network S, and more slowly to raise the resistance of resistor 16, an effect tending to unbalance network S, until there is inappreciable or no difference of potential between point 21 and contact 28 of slide-wire 1.

Contact 33 of relay 27 thereupon returns to its neutral position and the two assemblies 16—18 and 17—19 begin to cool but inasmuch as resistor 17 cools more rapidly the network S is again unbalanced in the same sense as before and relay 27 again closes its contacts 33, 34 to repeat the cycle above described. In the second cycle however the contacts 33, 34 remain closed for a longer time because the resistance of resistor 16 is now higher than it was at the beginning of the first cycle and therefore the temperature of resistor 17 must be raised to a higher temperature than in the first cycle before the difference in temperature of the two resistors is such that the ratio of their resistances again corresponds with the resistance ratio of the other two arms of bridge S.

So long as contact 28 is on the "low" side of the control point, the cycle is repeated and in the successive cycles the time of engagement of contacts 33, 34 becomes longer and longer. Accordingly, the temperature of resistor 31 becomes higher and higher and valve 9 is opened wider and wider with concurrent rebalancing adjustments of slide-wire 7 of network P.

From the foregoing, it is evident the greater the fall in temperature from normal, the longer the period of energization of the heaters 18, 19 and 29 in the first and subsequent cycles of the droop-corrective action and therefore the more rapid the speed of such action.

Similarly, when the temperature rises to an super-normal magnitude, in addition to the immediate proportional control action of network P, there is effected a droop-correction action by network S. So long as contact 28 is on the "high" side of the control point, the network S is repeatedly balanced and unbalanced by progressively increasing periods of engagement of contacts 33 and 35 during which the heaters 23, 26 and 30 are energized to increase the temperatures, and therefore the resistances, of resistors 22, 25 and 32.

Upon deviation of the temperature from the desired magnitude, due for example to change in furnace load, change in rate of combustion or other cause, the aforesaid control action of network S continues until the temperature is returned to normal without regard to what may be the change in setting of valve 9 required to attain that end.

By predetermining the thermal characteristics of the several assemblies of heaters and resistors, any desired rate of droop-corrective action may be obtained; and the speed of this action when the temperature is subnormal may be selected to be the same as, or higher or lower than, the speed of droop-correction for abnormal temperature (above normal). In the system of Fig. 1, the rate of droop-correction may be varied by adjustment of rheostats 43 and 44, the former in series with heaters 18 and 19 to vary their heating current and the latter in series with heaters 23 and 26 for the same purpose. Reduction of the current to the heaters requires the relay to hold its contacts closed for a longer period to effect rebalance of any given difference of potential between point 21 and slide-wire contact 28 and consequently the temperature of resistance 31, or 32, is changed at higher rate for any given displacement of contact 28 from its control point.

The variable resistances or rheostats 45 and 46 in shunt to slide-wires 1 and 7 and coupled for adjustment in unison may be provided conveniently to vary the throttling range of the control system; their settings determine the extent to which network P is unbalanced for any given displacement of contact 28 from the control point; the rheostat 45 in addition is adjustable to vary the extent to which network S is unbalanced for any given displacement of contact 28 from the control point.

To afford switching to and from the automatic droop-corrective action above described from and to manual control with minimum disturbance of the control system, there is additionally included, Fig. 2, the switch members 47, 48 which when in engagement with their contacts 49, 50 connect the heaters 18, 19, 23, 26, 29 and 30 in circuit controlled by the relay. When switch members 47, 48 are thrown to their other positions to engage contacts 51, 52, the heaters are no longer controlled by relay 27; the two branches of the heater circuit, one including heating coils 18, 19 and 29 and the other including heating coils 23, 26, and 30 are now connected to opposite terminals of slide-wire 53 whose contact 54 is manually adjustable to approximate the magnitude of the condition desired eventually to be obtained by the automatic control action.

The setting of contact 54 determines the percentage of the total heating current traversing each of the aforesaid branch circuits; the magnitude of the total heating current available during manual control is adjustable by rheostat 55 whose relatively movable element, contact or slide-wire, is mechanically coupled for movement in unison with the movable elements of throttling control rheostats 45, 46 of the automatic control system.

Thus at the beginning of a run, or at any time during a batch or continuous process, the operator may manually control the energization of the heaters by throwing switches 47, 48 to their upper position and adjusting slide-wire 53. Then when temperature, for example, is normal or approximately so, as indicated or recorded by indicator or recorder 5, the operator by throwing switches 47, 48 to their lower position may transfer control of the heaters to relay 27 of network S.

Though it is preferable the impedances 16, 17, 22, 25, 31 and 32 be resistances particularly for low frequency or direct-current energization of the networks P and S, they may be reactances whose inductance or capacity is a function of temperature; for example, the core of the inductance may be of any of the known alloys whose magnetic properties vary substantially with change of temperature or the dielectric of the condenser may be any of the known insulating compositions whose dielectric constant varies as a function of temperature.

When a condition other than temperature is to be controlled, the temperature-responsive device or apparatus is, as well understood in the art, replaced by one suited for response to the particular condition; for example, for measurement of pH of a solution, thermo-couple 4 is replaced by an ion-concentration cell of suitable type; for measurement of rate of flow, thermo-couple 4 may be replaced by manometer-actuated potentiometer. Similarly, when the agent controlling the magnitude of the measured condition is not a fluid, valve 9 or equivalent is replaced by a suitable control device; for example, a rheostat or induction regulator when the agent is electric current.

What I claim is:

1. A system comprising a balanceable network, means energizable to vary the impedance of one branch of said network at relatively slow rate and concurrently to vary the impedance of a second branch of said network at relatively rapid rate, means energizable to vary the impedance of said second branch at relatively slow rate and concurrently to vary the impedance of said one branch at relatively rapid rate, and means responsive to unbalance of said network effecting selective control of the energization of one or the other of said means in accordance with the sense of the unbalance.

2. A system comprising a balanceable network, electrical heating means energizable to vary the impedance of one branch of said network at relatively slow rate and concurrently to vary the impedance of a second branch of said network at relatively rapid rate, electrical heating means energizable to vary the impedance of said second branch at relatively slow rate and concurrently to vary the impedance of said one branch at relatively rapid rate, and means responsive to unbalance of said network effecting selective control of the energization of one or the other of said electrical heating means in accordance with the sense of the unbalance.

3. A system comprising a balanceable network, a pair of thermally variable impedances disposed in one branch of said network and having relatively large and small thermal inertias respectively, a pair of thermally variable impedances disposed in a second branch of said network and having relatively large and small thermal inertias respectively, means for concurrently heating the impedances of said pairs having respectively large and small thermal inertias, means for concurrently heating the other impedances of said pairs thereof, and means responsive to unbalance of said network effecting selective energization of one or the other of said heating means in accordance with the sense of the unbalance.

4. A system comprising a balanceable network, a pair of assemblies having different thermal inertias and each comprising an impedance and associated electrical heating means, means for connecting the impedances of said pair of assemblies in one branch of said network, a second pair of assemblies having different thermal inertias and each comprising an impedance and associated electrical heating means, means for connecting the impedances of said second pair of assemblies in another branch of said network, and means responsive to unbalance of said network for concurrently energizing for one sense of unbalance of the network the heating means associated with certain of aforesaid assemblies of different thermal inertias in different branches of said network and for concurrently energizing the other of the heating means of the other of aforesaid assemblies for opposite sense of unbalance of the network.

5. A system comprising a balanceable network, means energizable to vary the impedance of one branch of said network at relatively slow rate and concurrently to vary the impedance of a second branch of the network in the same sense but at relatively rapid rate, means energizable to vary the impedance of said second branch at relatively slow rate and concurrently to vary the impedance of said one branch in the same sense but at relatively rapid rate, and means responsive to unbalance of said network effecting selective control of the energization of one or the other of said means in accordance with the sense of the unbalance.

6. A system comprising a Wheatstone bridge, electrical heating means energizable to vary the resistance of one arm of said bridge at relatively slow rate and concurrently to vary the resistance of another arm of the bridge at relatively rapid rate, electrical heating means energizable to vary the resistance of said one arm at relatively rapid rate and concurrently to vary the resistance of said other arm at relatively slow rate, and means responsive to unbalance of said bridge for selectively controlling the energization of the two electrical heating means.

7. A system comprising two balanceable networks unbalanced in response to departure from a desired magnitude of a condition and one of which is rebalanced concurrently with adjustment of a control member affecting the rate of application of an agent controlling the magnitude of said condition, assemblies each comprising a thermally-variable impedance and associated heating means, connections for including said assemblies in said networks respectively, and means responsive to unbalance of the other of said networks for controlling energization of the heating means associated with both networks to effect rebalance of said other network and unbalance of said one of said networks.

8. A system comprising a balanceable network, assemblies each comprising a thermally variable impedance and associated heating means, connections for including said impedances in different branches of said network, a second balanceable network, heating means energizable to vary the impedance of one branch of said second network at relatively slow rate and concurrently to vary the impedance of a second branch thereof at relatively rapid rate, heating means energizable to vary the impedance of said second branch at relatively slow rate and concurrently to vary the impedance of said one branch at relatively rapid rate, and means responsive to unbalance of said second network effecting energization of one or the other of the heating means associated with the first-named network and concurrent energization of one or the other of the heating means associated with the second-named network.

9. A control system comprising two Wheatstone bridges, means responsive to departure from a desired magnitude of a condition for unbalancing both of said bridges, means energized upon unbalance of one of said bridges to vary the application of an agent affecting the magnitude of said condition and concurrently to effect temporary rebalance of said one of said bridges, thermally variable impedances included in said one of the bridges, heating means individual to said impedances, pairs of thermally variable impedances having different thermal inertias included in the other of said bridges, heating means individual to the pairs of impedances, and means responsive to unbalance of said other of the bridges for effecting, selectively, energization of one of the last-named heating means and of one of the first-named heating means.

10. A control system comprising two networks, means responsive to departure from a desired magnitude of a condition for unbalancing both networks, means energized upon unbalance of one of said networks to vary the application of an agent affecting the magnitude of said condition and concurrently to effect temporary rebalance of said one of said networks, assemblies each comprising a thermally variable impedance and associated heating means, connections including the impedances in said one of said networks, heating means energizable to vary the impedances of first and second branches of the other of said networks at relatively high and low rates respectively, heating means energizable to vary the impedances of said second and first branches at relatively high and low rates respectively, and means responsive to unbalance of said other of said networks selectively controlling the energization of the heating means of said assemblies to unbalance said one of said networks and of the heating means associated with the impedances of said first and second branches of said other of the networks to effect repeated balancing and unbalancing thereof until aforesaid departure is reduced to inappreciable magnitude.

11. A control system comprising a balanceable network unbalanced in response to departure from a desired magnitude of a condition and rebalanced concurrently with adjustment of a control member affecting the rate of application of an agent affecting the magnitude of said condition, thermally-variable impedances included in said network and having substantial temperature coefficients of impedance, a second balanceable network including impedance adjusted in response to aforesaid departure and assemblies having different thermal inertias each including thermally-variable impedance and associated electrical heating means, electrical heating means for said thermally variable impedances of the first-named network, and means responsive to unbalance of said second network for concurrently energizing the heating means associated with impedances of both networks and comprised in assemblies of different thermal inertias so to preclude continued balance of said first-named network except for at most inappreciable departure.

12. A system comprising a balanceable network, means energizable to vary the impedance of one branch of said network at relatively slow rate and concurrently to vary the impedance of a second branch of said network at relatively rapid rate, means energizable to vary the impedance of said second branch at relatively slow rate and concurrently to vary the impedance of said one branch at relatively rapid rate, means for automatically controlling the energization of both of said means comprising means responsive to unbalance of said network, manually operable control means for controlling the energization of both of said energizable means, and means for disabling either of said control means.

13. A system comprising a balanceable network, means energizable to vary the impedance of one branch of said network at relatively slow rate and concurrently to vary the impedance of a second branch of said network at relatively rapid rate, means energizable to vary the impedance of said second branch at relatively slow rate and concurrently to vary the impedance of said one branch at relatively rapid rate, automatic control means comprising means responsive to unbalance of said network, manually operable control means, and means for selecting either of said control means to control the energization of both of said energizable means.

14. A system comprising a balanceable network, a pair of thermally variable impedances disposed in one branch of said network and having relatively large and small thermal inertias respectively, a pair of thermally variable impedances disposed in a second branch of said network and having relatively large and small thermal inertias, respectively, means for concurrently heating those impedances of said pairs having large and small thermal inertias respectively, means for concurrently heating the other impedances of said pairs having small and large thermal inertias respectively, automatic control means comprising means responsive to unbalance of said network selectively to control one or the other of said heating means in accordance with the sense of unbalance, and manually operable means for differentially controlling both of said heating means.

ELWOOD T. DAVIS.